United States Patent Office 3,398,055
Patented Aug. 20, 1968

3,398,055
SEPARATION AND PURIFICATION
OF CELLULASE
Charles F. Bruno, East Brunswick, N.J., assignor, by mesne assignments, to E. R. Squibb & Sons, Inc., New York, N.Y., a corporation of Delaware
No Drawing. Filed Sept. 16, 1965, Ser. No. 487,901
8 Claims. (Cl. 195—66)

ABSTRACT OF THE DISCLOSURE

Cellulase produced by submerged cultivation of cellulase producing microorganisms is recovered from the medium by adsorption and elution from untreated or, preferably with alkali modified cotton.

---

The present invention relates to a novel method of preparing enzymes. More particularly, it relates to a novel method of preparing and isolating cellulase in a highly purified form by submerged cultivation and isolation by absorption and elution.

Presently cellulase is prepared utilizing the Koji (tray) process. This process involves preparing a substrate of sawdust, wheat bran, ammonium sulfate, and so forth, and adding water thereto to form a slurry. This slurry is placed in a tray or shallow pan and inoculated with a cellulase producing microorganism and allowed to ferment for a period of from five to six days. Brewer's yeast, cornsteep liquor, cereal mash, and the like, are representative of other substrates that may be utilized in the Koji (tray) process. However, these substrates are quite heterogenous in composition and contain a variety of fermentable constituents which give rise to enzymes such as amylases and pectinases. These slowly fermentable constituents often interfere with the isolation of the cellulase enzyme from the crude fermentation broths.

To isolate this enzyme from its fermentation broth requires several steps involving salt fractionation and solvent precipitation procedures, and the like, which in addition to being expensive and time consuming, may result in a final product which is of a gummy texture and which has only limited enzyme activity.

It has now been discovered that cellulase may be prepared by submerged fermentation comprising inoculating a medium with a cellulase producing organism aerating the inoculated medium during its fermentation period, absorbing the cellulase enzyme formed on an adsorbent material and eluting the cellulase from the absorbent material.

Examples of cellulase producing microorganisms that may be utilized in the practice of the invention are strains of organisms belonging to the genera: Trichoderma, Mryothecium, Penicillium, Aspergillus, Chaetomium, Xylaria, Polyporous, and Trametes. Organisms of the genera Trichoderma and Penicillium are preferred in the preparation of cellulase by submerged fermentation.

By submerged fermentation, also known as culturing, is meant fermentation that is performed in deep vessels through which air is passed at a rate from 0.5 to 3.5 ft./min., preferably from 1.0 to 2.0 ft./min. The rate of air flow is regulated so that no more than twenty-five to fifty percent of the enzymes being formed are inactivated. The broth in the vessels is agitated in a manner known to the art.

The broth utilized in the process has as its base a cellulosic material related to the material ultimately to be modified in the practical application of the cellulase being prepared, e.g., ground corn cob, jute, cotton linters, wheat bran hulk, and undenatured cellulose, such as Avicel (a microcrystalline cellulose developed by American Viscose, Incorporated). Nitrogen is supplied for growth and enyzme production mainly in the form of inorganic salts, such as ammonium phosphate or sulfate, with an effective amount of a simple organic nitrogenous compound as for example urea, and certain mineral salts such as calcium, magnesium, cobalt, and so forth.

During fermentation and cultivation it has been found that the pH of the medium may fall to below 3.8 or lower (3.2). In the process of the invention it is preferred to maintain an acidic pH with the preferred pH being from 4.0 to 4.8 and more preferably from 4.4 to 4.6. The temperature is maintained at from about 25 to 40° C., the preferred temperature being from 30° to 35° C. The length of time submerged fermentation is carried out depends upon the size of vessel utilized in the fermentation process. Preferably the culture should be fermented for about four to nine days, with best results achieved when the culture is fermented from about five to seven days.

Recovery and purification of a cellulolytic enzyme is effected in the process of this invention efficiently and economically by adsorption and elution from untreated or, preferably, alkali-modified adsorbent material, such as cotton linters or batting. The adsorbent material, which may be of any crude or purified variety, is soaked in an alkali solution, such as sodium hydroxide, potassium hydroxide, sodium bicarbonate, and so forth, having a normality concentration of from 1.0 to 10 normal preferably 4 to 6 normal for about thirty to sixty minutes, washed free of alkali, adjusted to pH 7.0 with dilute hydrochloric acid, and washed free of acid. Ideally, but not necessarily, adsorption and elution of enzymes is carried out by the column method. Adsorption of enzymes is carried out preferably at pH 4 to 5.5 and at 20 to 40° C. Adsorbed enzymes, free of extraneous organic and inorganic materials, are eluted at 15 to 25° C. with a dilute alkali. The adsorption-elution solution as set forth above having a concentration of from 0.0001 to 0.03 normal preferably .001 N. This procedure results in a ten-to-twenty-fold purification (enzyme activity/total solids basis) and about a ten-fold volume reduction. The enzymes can be concentrated further by solvent precipitation, e.g., by diluting the eluate into five volumes of acetone at about 5° C., collecting the precipitate and drying in vacuo. Alternatively, the eluate may be lyophilized by conventional procedures before or after concentration to volume by evaporation.

The following examples illustrate the invention. All temperatures are in degrees centigrade unless otherwise stated:

EXAMPLE 1

A lyophile culture (spores or mycelium preserved by freeze-drying) of *Trichoderma viride* (ATCC 16325)[1]

---

[1] American Type Culture Collection, Rockville, Md.

is used to inoculate 100 ml. of medium of the following compositions:

| | Percent |
|---|---|
| Ground corn cob | 1.5 |
| Acid treated cotton (Avicel) | 0.05 |
| Lactose | 0.1 |
| Urea | 0.03 |
| $(NH_4)_2HPO_4$ | 0.3 |
| $MgSO_4 \cdot 7H_2O$ | 0.03 |
| $CaCl_2$ | 0.03 |
| $FeCl_2 \cdot 4H_2O$ | 0.001 |
| $MnSO_4 \cdot 7H_2O$ | 0.001 |
| $CoCl_2 \cdot 6H_2O$ | 0.001 |
| $(NH_4)_6Mo_7O_{24} \cdot 4H_2O$ | 0.005 |
| $ZnSO_4 \cdot 7H_2O$ | 0.001 |
| $CuSO_4 \cdot 5H_2O$ | 0.001 |

The medium so described is made to volume with tap water, adjusted to pH 4.0, dispensed in 200 ml. portions in 500 ml. flasks, stoppered with cotton, and sterilized by autoclaving thirty minutes at 121° C.

The culture so inoculated is incubated at 30° C. on a rotary shaker oscillating at 280 cycles/min. in a circle of diameter 2 inches. After seven days a 5% (vol./vol.) transfer is made to several flasks of medium of the same composition similarly prepared. The second flask stage is incubated under conditions identical with those employed with the first. A third flask stage, consisting of 1000 ml. of medium in a 4-liter flask equipped with a side arm and inoculating bell (conventional equipment) is inoculated with the entire contents of one flask of the second stage. The medium in the third flask stage is the same as that in previous stages except that 0.05% sterile Ucon (an antifoam agent manufactured by Union Carbide) is incorporated after autoclaving for sixty minutes. Incubation of the third flask stage is carried out at 30° C. on a 240 cycle/min. mechanical shaker with a 1.5 inch diameter excursion, for seven days.

The entire content of the third flask stage is used to inoculate sixty gallons of medium composed as described for the third flask stage, with the addition of 0.1% $KH_2PO_4$, and with the further difference that the corn cob is sieved using Stokes granulator Model 43–4 with a 20-mesh screen. Sterilization is by steam injection through the sparger to effect sixty minutes at 121° C. In batching, corn cob is added last, after pH adjustment to 4.0. The pH after sterilization is adjusted to 5.0. At forty-eight hours the pH is 3.4; from that time onward, adjustment to 4.8 with 50% NaOH is made whenever the pH dropped to 4.0. Aeration is maintained at 2.0 ft./min. (superficial velocity) at 10 lb./sq. in. (gauge) for the first forty-eight hours, and then reduced to 1.0 ft./min. Agitation is minimal. Temperature is maintained at 30° C. Cultivation is continued under those conditions for 114 hours.

A portion (4.5 gal.) of the deep tank culture, aged 114 hours, prepared as described above is used to inoculate 150 gallons of medium contained in a 200 gallon stainless steel fermentor of conventional design. The medium is the same as that for the previous stage, except that the amount of $(NH_4)_2HPO_4$ is 0.4% (instead of 0.3), the Avicel is used in the amount of 1.0% (instead of 0.05), and the corn cob is not sieved. (The corn cob used is prepared by processing dried corn cobs through a Ball and Jewel Mill No. 4038.) Sterilization and manner of conducting the fermentation is as for the first deep tank stage. After 140 hours of cultivation 500 ml. of toluene is added as a preservative. The pH is adjusted between 4.0 and 5.5. The whole broth (144.5 gal.) is filtered first by means of a rotary vacuum filter (string type), and secondly, by passage through a precoated polishing filter (Sparkler type). The clarified filtrate including the washings with water measures 120 gallons. The clarified filtrate, containing $6.8 \times 10^6$ units of activity, (the unit of cellulase is that amount of enzyme that will solubilize 10 μg. of filter paper per hour at pH 5.0 and 40° C.) is adjusted to pH 5.0, and passed through a column 6 x 41 inches containing 3.1 kg. of cotton. (Unbleached Carolina Pharmaceutical Absorbent Cotton is used, modified by soaking in 72 liters of 20% sodium hydroxide for forty-five minutes, washing with water, and neutralizing with 16 ml. of 12 N HCl). The filtrate is passed through the column at a rate of 2 liters/minute. Elution of enzyme activity is accomplished by passing 0.001 N NaOH (75 liters) through the column and collecting 53 liters containing $4.63 \times 10^6$ units. The pH of the eluate is adjusted to 5.0 with 1.2 N HCl, reduced in volume 6-fold by evaporation, and lyophilized. A powder (78 g.) is obtained. The powder contains $4.7 \times 10^6$ units of activity; thus, recovery of activity, filtrate to powder, is 70%.

EXAMPLE 2

Ten liters of a culture broth is prepared as in Example 1 except that the microorganism utilized is *Penicillium variable* (ATTC 16340, Rockville, Md.). This culture is adjusted to pH 5.0 and passed through a glass column 5 x 18 cm. at the rate of 100 ml./min. The glass column is packed with absorbent cotton which is soaked in 20% NaOH for thirty minutes, neutralized with 12 N HCl and washed with water. After the addition of the enzyme-rich culture complete, the enzymatic activity is eluted with 2 liters of .001 N NaOH. The volume of the eluate collected is 1.3 liters containing 94% of the enzymatic activity. To prevent inactivation of the enzyme, the eluate is immediately adjusted to pH 5.0 with dilute HCl. In addition to 20 fold purification, the enzyme is concentrated 6 fold. The enzyme units in the filtrate are assayed to be $2 \times 10^5$, whereas the eluate contains $1.88 \times 10^5$. Evaporation of the enzyme 5 fold and solvent precipitation results in a final recovery of 80%. The total weight of enzyme recovery is 4 gm. ($1.6 \times 10^5$ units).

EXAMPLE 3

The procedure of Examples 1 and 2 are repeated except the concentrations of ground corn cob utilized are varied from 1.0 to 3.0%. The medium containing the higher concentrations of corn cob has an additional 0.3% inorganic nitrogen [$(NH_4)_2SO_4$] added. When the filtrate of each vessel is assayed, a substantial enzyme product is noted.

EXAMPLE 4

The procedures of Examples 1 and 2 are repeated except the medium contains less than 1.0% grown corn cob, 1.0% Avicel and 0.6% inorganic nitrogen are included. Both *Trichoderma viride* and *Penicillium variable* have synthesized an excellent quantity of cellulase.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. A process for preparing cellulase which comprises inoculating a medium contained within a submerged a fermentation vessel with a cellulase-producing organism, aerating the inoculated medium during its fermentation period, and separating the cellulase formed during this period by adsorbing the cellulase on a cotton adsorbent.

2. A process in accordance with claim 1 wherein the organism is selected from the genus consisting of Trichoderma, Myrothecium, Pencillium, Aspergillus, Chaetomium, Xylaria, Polyporous and Trametes.

3. A process in accordance with claim 1 wherein the medium contains ground corn cob.

4. A process for preparing cellulase which comprises inoculating a culture medium contained within a submerged fermentation vessel with a cellulase-producing organism, maintaining the culture in an acidic pH, aerating the inoculated medium during its fermentation period and separating the cellulase formed during this period by adsorption on a cotton adsorbent material and elution of the cellulase thereafter.

5. A process in accordance with claim 4 wherein the medium is maintained at a temperature of from about 25° to 40° C.

6. A process in accordance with claim 4 wherein the pH of the medium is from about 3.2 to 4.8.

7. A process in accordance with claim 8 wherein the cotton adsorbent material is treated with 20% sodium hydroxide and then neutralized with hydrochloric acid prior to adsorbing cellulase thereon.

8. A process of separating cellulase from its culturing medium which comprises adsorbing the cellulase on cotton adsorbent material and eluting the cellulase from cotton with a dilute alkali solution.

References Cited
UNITED STATES PATENTS

| | | | |
|---|---|---|---|
| 3,232,832 | 2/1966 | Ono | 195—66 X |
| 3,310,476 | 3/1967 | Yerkes | 195—66 |

OTHER REFERENCES

Basu, S. N., et al.: Canadian Journal of Microbiology, vol. 6, pp. 265–282 (1960).

Reese, E. T. (Editor): Advances in Ezymic Hydrolysis of Cellulase and Related Materials (March 1962), pp. 105–114.

LIONEL M. SHAPIRO, *Primary Examiner.*